(12) United States Patent
Itoh et al.

(10) Patent No.: US 6,415,914 B2
(45) Date of Patent: Jul. 9, 2002

(54) CONVEYOR SYSTEM

(75) Inventors: Kazuo Itoh, Kasai; Toshiyuki Tachibana, Himeji; Yoshiyuki Kujihashi, Ono, all of (JP)

(73) Assignee: Itoh Electric Company, Limited, Kasai (JP)

( * ) Notice: Subject to any disclaimer, the term of this patent is extended or adjusted under 35 U.S.C. 154(b) by 57 days.

(21) Appl. No.: 09/755,403

(22) Filed: Jan. 5, 2001

(30) Foreign Application Priority Data

Jan. 11, 2000 (JP) ........................................ 2000-002824

(51) Int. Cl.⁷ .............................................. B65G 13/06
(52) U.S. Cl. ................................... 198/781.06; 198/788
(58) Field of Search ............................. 198/788, 781.06, 198/783, 460.1

(56) References Cited

U.S. PATENT DOCUMENTS 5,285,887 A    2/1994  Hall
6,035,999 A  * 3/2000  Hall .......................... 198/788

* cited by examiner

Primary Examiner—Kenneth W. Noland
(74) Attorney, Agent, or Firm—Duane Morris LLP

(57) ABSTRACT

A conveyor system is divided into a plurality of zones each including a plurality of rollers arranged in parallel with each other. The zones are arranged successively for conveying articles from the upstream end to the downstream end of the conveyor system. One of the rollers in each zone is a drive roller. Article detectors are disposed in association with the respective zones and develop an article-representative signal when they detect an article in the associated zones. A current detector detects the sum of currents flowing through motors driving the drive rollers and develops a excessive-current representative signal when the sum current exceeds a reference current value. A current suppressing circuit connected to the article detectors and to the current detector causes limited currents to be supplied only to motors including the motors in the zones where the first and second in order ones of articles being conveyed are present. The limited currents supplied to the motors are such that the sum is equal to a predetermined allowable value.

7 Claims, 4 Drawing Sheets

CONVEYOR SYSTEM

This invention relates to a conveyor system and, more particularly, to a conveyor system which can be operated from a power supply of smaller capacity than prior art system.

BACKGROUND OF THE INVENTION

An example of prior art conveyor system includes a pair of frames facing each other with a spacing disposed between them. A number of conveyer rollers are mounted between the two frames, being disposed adjacent to each other. The conveyor system is divided into a plurality of zones arranged along the direction in which articles are to be conveyed by the conveyor system, and each zone includes a plurality of rollers. One roller in each zone is driven to rotate by a motor. Current is supplied from a power supply to each of the motors. The capacity of the power supply is equal to the maximum current which could be supplied to one motor multiplied by the number of the motors used.

Such maximum current flows in each motor only when the motor is started or locked, and the power supply supplies current to its maximum capacity only when all of the motors in the conveyor system are started or locked at the same time. However, it hardly occurs that all of the motors are started or locked simultaneously with each other, and, therefore, a power supply large in capacity and, therefore, in size has raised the manufacturing cost. However, if such a large capacity power supply is simply replaced by a smaller capacity one, one or more motors must be stopped when current exceeding the allowable capacity of the power supply flows. Stopping motors randomly may disadvantageously interrupt the transportation of articles.

An object of the present invention is to provided a conveyor system which can be driven from a small capacity power supply, with its conveying action not interrupted due to the use of such small capacity power supply, and which can be manufactured at a low cost.

SUMMARY OF THE INVENTION

A conveyor system according to the present invention includes a plurality of rollers arranged side by side in a plurality of zones arranged from the upstream toward the downstream of the conveyor system.

The conveyor system includes also a plurality of motors, each driving at least one roller in each zone so that an article can be conveyed to pass the zones successively. Each motor can be mounted in a space within the associated roller or can be mounted outside the associated roller.

A plurality of article detecting means are provided for respective ones of the zones. The article detecting means develops an article-representative signal when an article is present in the zone associated with that article detecting means. Any of various types of article detecting means can be used. For example, optical detectors, ultrasonic detectors, or magnetic detectors may be used.

Hereinafter, a zone in which an article is present, or being conveyed, is sometimes referred to as loaded zone.

Current detecting means is provided, which detects the sum of current flowing through the operating, or rotating, motors, and develops an excessive-current representative signal when the sum of the currents exceeds a predetermined reference current value.

Control means is connected to the respective article detecting means and to the current detecting means. The control means operates, when the excessive-current representative signal is present, to allow such currents to be supplied to a plurality of motors that the sum of the currents is below a predetermined allowable current value. These plural motors include the ones in the loaded zones where those articles first and second in sequence of successive articles being conveyed are present. The predetermined allowable current value may be equal to the predetermined reference current value. Alternatively, the reference current value may be the allowable current value multiplied by a predetermined factor smaller than unity. The control performed by the control means is repeated, for example, at predetermined time intervals.

The control means may include motor drive means for each of the motors, current adjusting means for adjusting the current to be supplied to each motor drive means, and judging means for judging which one or ones of the current adjusting means should be caused to supply current, based on the excessive-current representative signal and the article-representative signal. The judging means may include determining means for determining motors which should be normally driven based on the article-representative signals, and selecting means for selecting a motor to be actually driven out of the motors determined by the determining means.

When the sum of the currents flowing in the currently operating motors of the conveyor system exceeds the reference current value, the maximum value of the sum of the currents flowing in the motors is limited to the allowable current value. Thus, a power supply small in capacity and, therefore, small in size can be used, which reduces the manufacturing cost of the conveyor system. The sum current limitation is carried out in such a manner that current can be continuously supplied to the motors in those loaded zones in which the first and second articles on the conveyor systems are being conveyed, so that the first and second articles continue to be conveyed even when the current limitation is performed. In this case, current is not supplied to the motors in those loaded zones in which the third and succeeding articles are being conveyed.

The control means may be so arranged that a predetermined largest proportion of the allowable sum current (hereinafter referred to as largest proportion current), at the maximum, can be supplied to the motor in the loaded zone in which the first article is being conveyed. Accordingly, the first article can be conveyed without fail even if it is heavy in weight. In other words, the first article has priority in conveyance over the remaining articles.

The control means may be adapted such that a predetermined intermediate proportion of the allowable sum current (hereinafter referred to as intermediate proportion current), at the maximum, can be supplied to the motor in the zone adjacent downstream to the loaded zone through which the first article is being conveyed. The intermediate proportion current is smaller than the largest proportion current. Needless to say, in this case, the first article is not in the downstream end zone. When the first article reaches the adjacent downstream zone, the current supplied to the motor in this adjacent downstream zone may be increased to the largest proportion current. Because the current flowing through the motor in the adjacent downstream zone before the first article arrives at it is of the intermediate value, a transient current can be small.

The control means may be adapted such that a smallest current proportion, at the maximum, which is smaller than the intermediate current proportion, can be supplied to the motor in the loaded zone through which the second article is being conveyed, so that the second article is conveyed at a low speed. Accordingly, the second article continues to be conveyed even at a low speed, which can reduce the conveying time relative to the time where the second article is stopped.

The control means may be adapted such that the largest proportion current at the maximum can be supplied to the motor in the loaded zone through which the first article is being conveyed and that the intermediate proportion current at the maximum can be supplied to the motor in the loaded zone through which the second article is being conveyed, if the zone through which the first article is being conveyed is the downstream end zone. With this arrangement, the first article can be conveyed through the downstream end zone with the largest proportion current so that the first article priority conveyance can be maintained, and, still, the time required to convey the second article does not increase because the motor for the second article is driven with the intermediate proportion current.

The control means may be adapted such that a current equal to or less than a current proportion smaller than the intermediate proportion current can be supplied to the motor in the zone adjacent downstream to the loaded zone through which the second article is being conveyed. With this arrangement, even if it is so arranged that the current through the motor of the adjacent downstream zone is to be increased to the largest or intermediate proportion current when the second article in the preceding loaded zone reaches it, only a small transient current flows in the motor of the adjacent downstream zone.

The current detecting means may be adapted to detect the sum of currents flowing through the currently operating motors, and develop a first excessive-current representative signal when the current sum exceeds a predetermined first reference current value, and a second excessive-current representative signal when the current sum is equal to or larger than a predetermined second reference current value and smaller than the first reference current value. The second reference current value is smaller than the first reference current value. Then, the control means, when the first excessive-current representative signal is present, make it possible to provide currents only to respective ones of a plurality of motors including the motors in the loaded zones through which articles first and second in sequence are being conveyed. The sum of the currents is equal to or below a predetermined allowable current value. In the presence of the second excessive-current representative signal, the control means enable currents to be supplied to a larger number of motors including the motors in the loaded zones through which the first and second articles are being conveyed, than the number of motors driven when the first excessive-current representative signal is present. The motors to be driven are selected from those which are to be driven when no current limitation is provided. The largest proportion current to be supplied to the motor in the zone through which the first article is being conveyed may be maintained at the value equal to the value of the current to be supplied to it when the first excessive-current representative signal is developed. Also, if the motor in the zone adjacent downstream to the zone through which the first article is being conveyed is adapted to be driven, too, the largest proportion current may be equal to the one supplied to it when the first excessive-current representative signal is developed.

With this arrangement, when the sum current value changes to a value smaller than the first reference current value but equal to or larger than the second reference current value after the motors have been controlled to conduct, for example, an allowable current sum, the number of the motors driven can be increased so that articles can be rapidly conveyed. In this case, the allowable current value may be equal to the one to or below which the sum current is reduced when the sum current exceeds the first reference value.

DETAILED DESCRIPTION OF THE INVENTION

Figure 1:
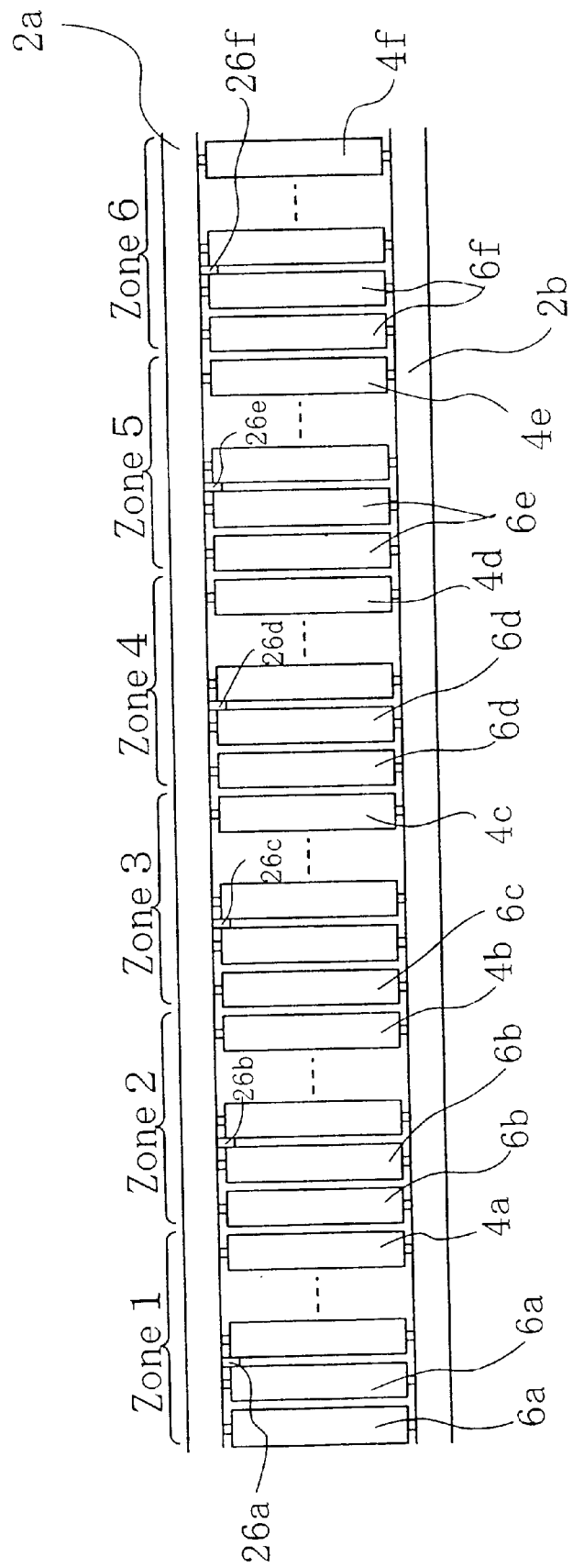
FIG. 1 is a plan view of part of a conveyor system according to one embodiment of the present invention.

As shown in FIG. 1, a conveyor system according to one embodiment of the present invention has two parallel, spaced-apart frame members 2a and 2b. A plurality of conveyor rollers are arranged in parallel with each other between the frame members 2a and 2b, with their longitudinal central axes held substantially perpendicular to the frame members 2a and 2b. The rollers are disposed in a plurality of adjacent zones, for example, in six zones 1 through 6. An article is conveyed from the upstream end zone 1 to the downstream end zone 6. It should be noted that another set of similar zones 1–6 may be disposed downstream and/or upstream to the set of zones 1–6 shown.

The zone 1 includes at least one motor-driven, drive roller 4a and a plurality of slave-driven idler rollers 6a.

Figure 2:
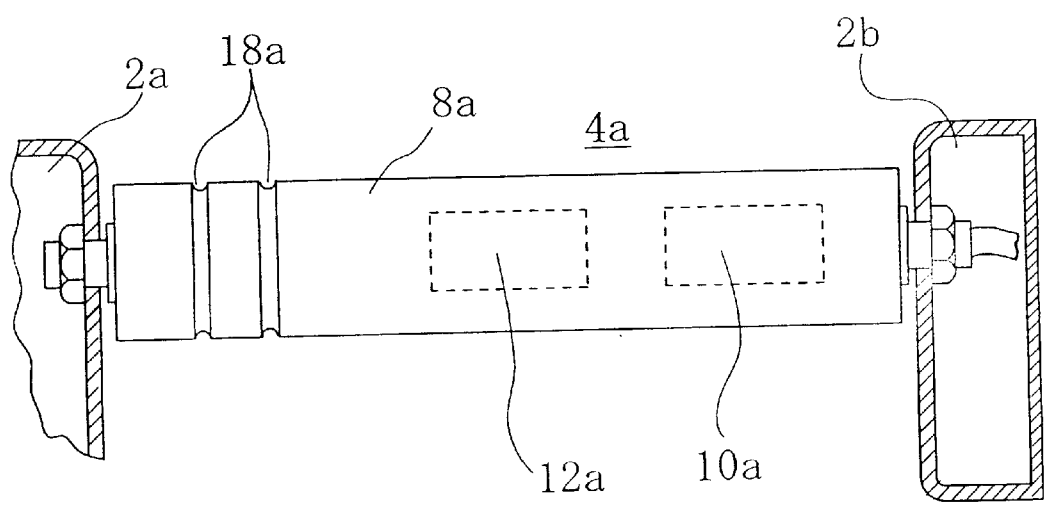
FIG. 2 is a side view of a motor-driven, drive roller used in the conveyor system shown in FIG. 1.

As shown in FIG. 2, the drive roller 4a includes a cylindrical body 8a, and a motor, e.g. a DC motor 10a disposed within the cylindrical body 8a. The rotation of the motor 10a is transmitted via a transmission 12a also disposed within the cylindrical body 8a to the cylindrical body 8a so as to rotate it about its longitudinal center axis.

Figure 3:
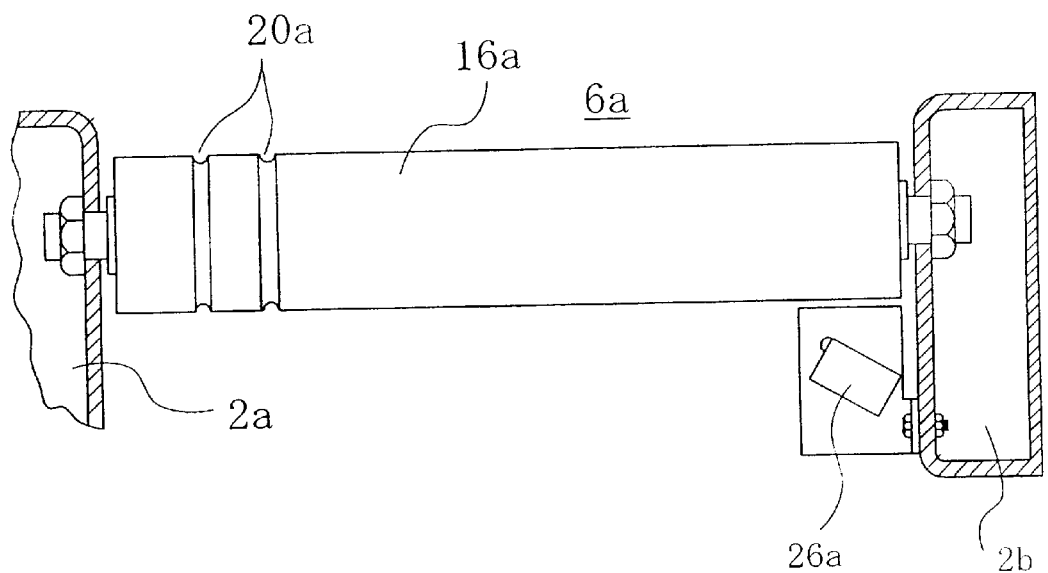
FIG. 3 is a side view of a slave-driven idler roller used in the conveyor system shown in FIG. 1.

As shown in FIG. 3, each of the idler rollers 6a includes a cylindrical body 16a rotatable about its longitudinal center axis, but it does no include a motor within the cylindrical body 16a.

A drive roller 4a is connected to idler rollers 6a in the same zone by, for example, a belt (not shown) which is looped around the rollers, being disposed within grooves 18a and 20a. Thus, the cylindrical body 16a of the idler roller 6a is driven to rotate in the same direction as the cylinder 8a of the drive roller 4a when the cylindrical body 8a rotates.

Similar to the zone 1, the zones 2 through 6 include similar drive rollers 4b through 4f and idler rollers 6b–6f, respectively, as shown in FIG. 1.

Figure 4:
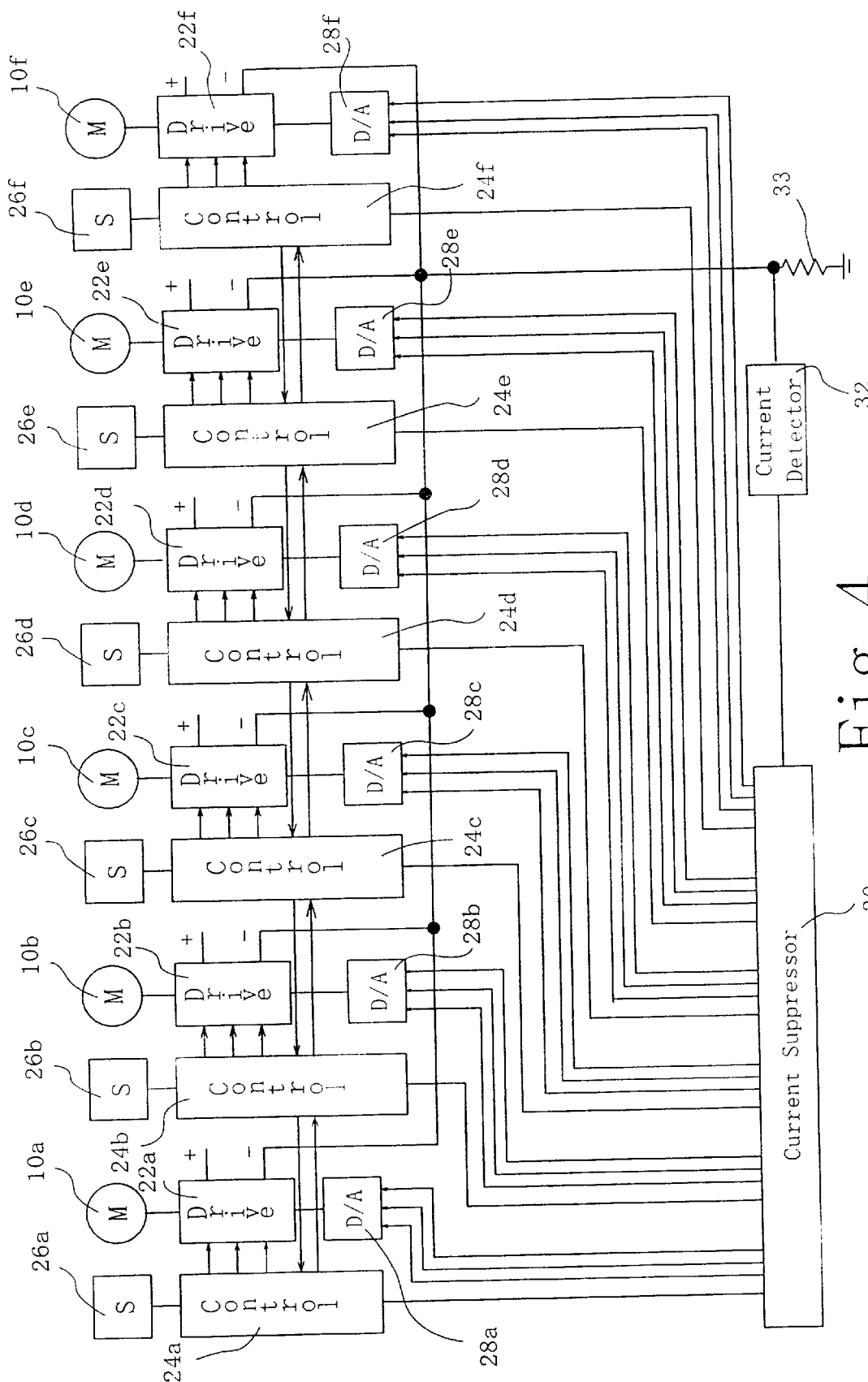
FIG. 4 is a block diagram of a control apparatus for the conveyor system shown in FIG. 1.

Referring to FIG. 4, motors 10a–10f of the drive rollers 4a–4f are driven with currents supplied from associated motor driving means, e.g. drivers 22a through 22f, respectively. Determining means, e.g. controllers 24a through 24f are provided for the respective drivers 22a through 22f. The controllers 24a–24f supply control signals to the associated drivers 22a–22f to provide start and stop control and speed control of the associated motors 10a–10f. Current driving a motor flows into the associated driver via a plus (+) terminal and flows out via a minus (−) terminal of that driver.

Article detecting means, e.g. optical article detectors 26a through 26f are connected to the controllers 24a–24f, respectively. The article detectors 26a–26f are disposed in association with the zone through 6, respectively, as shown in FIG. 1. Each of the article detectors 26a–26f is disposed in a lower portion of each zone as shown in FIG. 3, and emits light, e.g. infrared radiation, into the associated zone through a space between adjacent rollers, e.g. idler rollers. Each article detector receives light reflected from an article, if present in the associated zone, and develops an article-representative signal.

Although not shown, an upstream end side article detector, which detects an article, if present, in an upstream adjacent region of the upstream end zone and develops an article-representative signal, is connected to the controller 24a for the zone. By the upstream adjacent region, the downstream end zone of the preceding set of similar zones, an article supplying source or the like is meant. Similarly, a downstream end side article detector (not shown), which detects an article present in a downstream adjacent region of the downstream end zone and develops an article-representative signal, is connected to the controller 24f for the zone 6. By the downstream adjacent region, the upstream end zone of the succeeding set of similar zones, an article receiving unit or the like is meant. The controllers 24a through 24f determine which motors are to be driven, based on the article-representative signals from the article detector 26a through 26f and the upstream end side and downstream end side article detectors.

Current adjusting means, e.g. digital-to-analog (D/A) converters 28a through 28f are connected to the drivers 22a through 22f, respectively. The D/A converters 28a–28f supply current adjusting control signals to the associated drivers 22a–22f. Each of the D/A converters 28a–28f converts a 3-bit digital signal supplied from a current suppressing circuit 30 into an analog signal, which is supplied to its associated driver.

The current suppressing circuit 30 has three output terminals for each of the D/A converters 28a through 28f. In order for a largest current of, for example, 3 A, at the maximum, to be able to be supplied to a given motor, only one output terminal for the largest current of 3 A (hereinafter referred to as 3A terminal) for the D/A converter associated with that motor is placed at a high (H) level, and the remaining two output terminals are placed at a low (L) level. In order for an intermediate current of, for example, 2 A, at the maximum, to be able to be supplied to that motor, only the output terminal (hereinafter referred to 2A terminal) for the intermediate current of 2 A is placed at the high (H) level, and the remaining two output terminals are placed at the low (L) level. Similarly, in order for a smallest current of, for example, 1 A, at the maximum, to be able to be supplied to that motor, only the output terminal (hereinafter referred to 1A terminal) for the smallest current of 1 A is placed at the high (H) level, and the remaining two output terminals are placed at the low (L) level. The sum of the maximum largest, intermediate and smallest currents, 6 A in the present example, is the allowable current for all the motors 10a through 10f which a power supply of the conveyor system can supply.

The current suppressing circuit 30 determines which one of the D/A converters should be supplied with one of the three currents and also which one of the three output terminals for that D/A converter should be placed at the H level. This determination is made based on an energization signal supplied from each of the controllers 24a through 24f. The energization signal is developed by each of the controllers 24a–24f in response to the article representative signal developed when an article is detected by the associated article detector.

The current suppressing circuit 30 operates in first and second current suppression modes. The current suppressing circuit 30 operates in the first current suppression mode when a current detector 32 detects when the sum of the current flowing through the motors 10a–10f reaches or exceeds a predetermined first reference current value of, for example, 5 A. The current suppressing circuit 30 operates in the second current suppression mode when the current detector 32 detect when the sum of the currents flowing through the motors 10a–10f becomes equal to or larger than a predetermined second reference current value of, for example, 4 A, but smaller than the first reference current value, 5 A.

Currents flowing out of the minus terminals of the respective drivers 22a–22f flow through a resistor 33, and the current through the resistor 33 is detected by the current detector 32. The current detector 32 may include an amplifier which amplifies the voltage across the resistor 33. It also includes a first comparator which develops a first excessive-current representative signal when the output voltage of the amplifier is equal to or larger than a first reference voltage corresponding to the first reference current, and a second comparator which develops an output signal when the output voltage of the amplifier is equal to or larger than a second reference voltage corresponding to the second reference current. The current detector 32 includes a logic circuit which develops a second excessive-current representative signal when the second comparator develops the output signal and the first comparator does not develop the first excessive-current representative signal.

The controllers 24a–24f, the drivers 22a–22f, the D/A converters 28a–28f and the current suppressing circuit 30 form control means, which may be disposed in the internal space provided in the frame member 2a or 2b.

Figure 5:
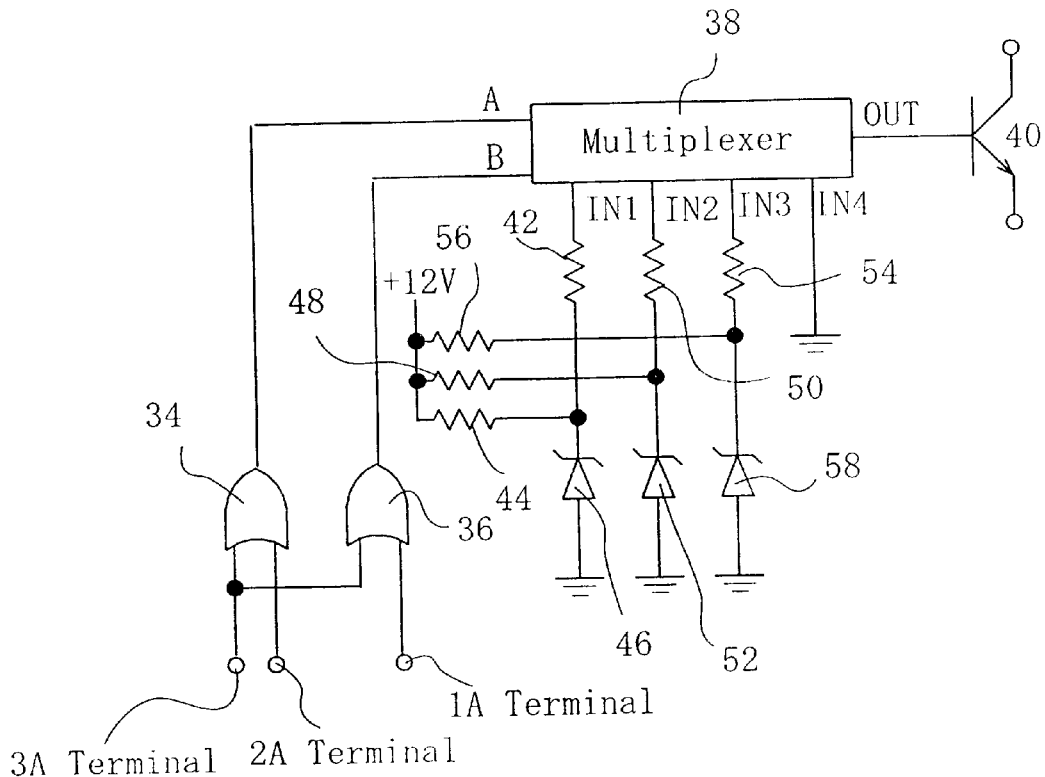
FIG. 5 is a detailed block diagram of digital-to-analog (D/A) converters used in the conveyor system shown in FIG. 1.

FIG. 5 shows the configuration of the DIA converters 28a–28f. Each of the D/A converters 28a–28f includes an OR gate 34 having their inputs connected to the 3A terminal and 2A terminal of the current suppressing circuit 30 corresponding to that D/A converter. The D/A converter includes an OR gate 36, too, with one of its inputs connected to the remaining 1A terminal of the current suppressing circuit 30. The other input of the OR gate 36 is connected to the 3A terminal. The OR gates 34 and 36 have their outputs connected to A and B selection terminals of a multiplexer 38.

The multiplexer 38 has four input terminals IN1, IN2, IN3 and IN4 and an output terminal OUT. The multiplexer 38 selectively couples the input terminals IN1–IN4 to the output terminal OUT in accordance with the signal levels of the selection terminals A and B.

The input terminal IN1 is connected to a current supply which supplies a current necessary for controlling the conduction state of a transistor 40 connected to the output terminal OUT in such a manner that current of 3 A, at the maximum, can be supplied to the corresponding motor. The current supply is formed of resistors 42 and 44 and a zener diode 46. The resistor 44 and the zener diode 46 is serially connected between a +12 V voltage supply and ground with the anode of the zener diode 46 grounded. The resistor 42 is connected between the junction of the resistor 44 and the zener diode 46 and the input terminal IN1.

Similarly, the input terminal IN2 is connected to a current supply which supplies a current necessary to control the conduction of the transistor 40 in such a manner that current of 2 A, at the maximum, can be supplied to the corresponding motor. This current supply is formed of resistors 48 and 50 and a zener diode 52. The resistor 48 and the zener diode 52 are serially connected between the +12 V voltage supply and ground with the anode of the zener diode 52 grounded. The resistor 50 is connected between the junction of the resistor 48 and the zener diode 52 and the input terminal IN2.

The input terminal IN3 is connected to a current supply which supplies a current necessary to control the conduction of the transistor 40 in such a manner that current of 1 A, as the maximum, can be supplied to the corresponding motor. This current supply is formed of resistors 54 and 56 and a zener diode 58. The resistor 56 and the zener diode 58 are serially connected between the +12 V voltage supply and ground with the anode of the zener diode 58 grounded. The resistor 54 is connected between the junction of the resistor 56 and the zener diode 58 and the input terminal IN3.

The input terminal IN4 is grounded, and, therefore, when the input terminal IN4 is selected, the transistor 40 is rendered nonconductive.

When only the 3A terminal of the current suppressing circuit 30 for a given one of the D/A converters 28a–28f is at the H level with the other terminals 2A and 1A placed at the L level, the outputs of both OR gates 34 and 36 and, hence, both the selection terminals A and B of the multiplexer 38 are placed at the H level, so that the input terminal IN1 of the multiplexer 38 is coupled to the output terminal OUT, which makes it possible to supply current of 3 A, at the maximum, to the corresponding motor.

When only the 2A terminal is at the H level with the other terminals 3A and 1A placed at the L level, only the output of the OR gate 34 is placed to the H level, so that the selection terminals A and B of the multiplexer 38 are placed at the H level and the L level, respectively. This causes the input terminal IN2 of the multiplexer 38 to be coupled to the output terminal OUT, which makes it possible for current of 2 A, at the maximum, to be supplied to the corresponding motor.

When only the 1A terminal is at the H level with the other terminals 3A and 2A placed at the L level, only the output of the OR gate 36 is placed to the H level, so that the selection terminals A and B of the multiplexer 38 are placed at the L level and the H level, respectively. This causes the input terminal IN3 to be coupled to the output terminal OUT, which makes it possible for current of 2 A, at the maximum, to be supplied to the corresponding motor.

With all of the 3A, 2A and 1A terminals being at the L level, both the selection input terminals A and B are placed at the L level, so that the input terminal IN4 is coupled to the output terminal OUT. This renders the transistor 40 nonconductive, and no current control is provided by the current suppressing circuit 30.

The controllers 24a–24f control the associated motors 10a–10f in accordance with the article representative signals developed by the article detectors 26a–26f and the upstream and downstream end side article detectors (not shown). For this purpose, when an article is present in the associated zone, each of the controllers 24b through 24f, notifies the controllers for its adjacent upstream zones of the presence of an article, by providing the controllers for the upstream zones with the article-representative signal. Also, when an article is present in the associated zone, each of the controllers 24a through 24e, notifies the controllers for its adjacent downstream zones of the presence of an article, by providing the controllers for the downstream zones with the article-representative signal. (In order to distinguish the article-representative signal developed by the article detector in a given zone from the article-representative signal sent from the controller for either the adjacent upstream or downstream zone, the article-representative signal provided by the controller for the adjacent zone is referred to as article-presence signal hereinafter.)

Each of the controllers 24a–24f, when the article-presence signal is supplied to it from the controller for the adjacent downstream zone, while an article is present in its associated zone, causes its associated motor not to be energized so as to prevent collision between articles. On the other hand, if no article-presence signal is applied from the adjacent downstream zone controller, the controller causes the associated motor to be energized since there is no fear of collision of articles. The controller 24f for the downstream end zone 6 is supplied with the article-representative signal, from the downstream end side article detector, as the article-presence signal.

Each of the controllers 24a–24f causes the associated motor to be energized when the article-presence signal is applied to it from the controller for the adjacent upstream zone while no article is present in its associated zone, and causes the associated motor to stop when no article-presence signal is supplied from the adjacent upstream zone controller while no article is present in the associated zone. The controller 24a for the upstream end zone receives the article-representative signal from the upstream end side article detector as the article-presence signal.

Now let it be assumed that there are articles being conveyed in the zone 1, 2 and 4. Because of the article present in the zone, the motor 10a for the zone is stopped. Because of no article present in the zone, the motors 10b and 10c for the zones 2 and 3 are energized to rotate. The motors 10d and 10e for the zones 4 and 5 are energized to rotate since there is no article present in the zone 5.

If articles are present in the zones 3 and 5, the motors 10c, 10d, 10e and 10f for the zones 3, 4, 5 and 6 are energized to rotate. Each of the controllers 24a through 24f provides the current suppressing circuit 30 with a motor-operation signal when its associated motor is operated.

As described above, the motors 10a–10f for the zone 1–6 are controlled by the article-presence (article-representative) signals. However, when the sum of the currents flowing through the currently operating motors becomes equal to or larger than the first reference current value, i.e. when the current detector 32 develops the first excessive-current representative signal, the current suppressing circuit 30 operates in the first current suppression mode so that the sum current flowing through the motors decreases below a predetermined allowable current value, e.g. 6 A.

In the first current suppression mode, the current suppressing circuit 30 operates in accordance with the motor-operation signals provided by the controllers associated with the currently operating motors, giving priority to downstream zones. For example, the current suppressing circuit 30 operates in such a manner that the largest proportion, at the maximum, out of the allowable current can be supplied to the motor for the most downstream one of the zones in which articles are present. (A zone in which an article is present is referred to as loaded zone.) If there is a downstream zone adjacent to the most downstream loaded zone, the intermediate proportion, at the maximum, out of the allowable current can be supplied to the motor for the adjacent downstream zone. The motor for the second downstream loaded zone, which is upstream to the most downstream loaded zone, is adapted to be supplied with the smallest proportion, at the maximum, out of the allowable current. The motors for the other loaded zones are stopped.

It is so arranged that if there is no adjacent zone downstream to the most downstream loaded zone, the largest proportion current, at the maximum, can be supplied to the motor for the most downstream loaded zone, the intermediate proportion current, at the maximum, can be supplied to the motor for the second most downstream loaded zone, and the smallest proportion current, at the maximum, can be supplied to the motor for the zone adjacent downstream to the second most downstream loaded zone.

For example, let it be assumed again that articles present in the zone 1, 2 and 4. In this case, as described previously, the motors 10b, 10c, 10d and 10e for the zones 2, 3, 4 and 5 are operated. When the sum current flowing through the currently operating motors, i.e. the motors 10b, 10c, 10d and 10e, becomes equal to or larger than 5 A, the first excessive-current representative signal is supplied to the current suppressing circuit 30. As a result, the motor 10d for the loaded zone 4 is supplied with a current of 3 A, at the maximum, the motor 10e for the zone 5 is supplied with a current of 2 A, at the maximum, and the motor 10b for the loaded zone 2 is supplied with a current of 1 A at the maximum. In this case, the motor 10c for the zone 3 is stopped.

When articles are in the zones 3 and 5, the motors 10c, 10d, 10e and 10f for the zones 3, 4, 5 and 6 are operating, as described previously. When the first excessive-current representative signal is applied to the current suppressing circuit 30, the current suppressing circuit 30 causes the motor 10e for the loaded zone 5 to be supplied with a current of 3 A, at the maximum, the motor 10f for the zone 6 to be supplied with a current of 2 A, at the maximum, and the motor 10c for the zone 3 to be supplied with a current of 1A, at the maximum. The motor 10d for the zone 4 is stopped.

In another case, articles may be present in the zone 1, 2, 4 and 6. Since an article is present in the downstream end zone 6 and no article-representative signal is supplied to the controller 24f from the downstream end side article detector, the current suppressing circuit 30 judges that there is no article present downstream the loaded zone 6 and energizes the motor 10f for the loaded zone 6. Since there is a zone, i.e. the zone 5, downstream to the loaded zone 4, the motors 10d and 10e for the zones 4 and 5 are also energized. Since no article is present in the zone 3, the motors 10b and 10c for the zones 2 and 3 are also energized. The motor 10a for the zone is not energized because an article is present in the zone 2. That is, in this case, the motors 10b, 10c, 10d, 10e and 10f for the zones 2, 3, 4, 5 and 6 are operated.

When the first excessive-current representative signal is applied to the current suppressing circuit 30 in this state, the current suppressing circuit 30 causes the motor 10f for the downstream end zone 6 to be supplied with a current of 3 A, at the maximum. Since an article is not present downstream to the zone 6, the motor 10d for the zone 4, which is the second most downstream loaded zone, is supplied with a current of 2 A, at the maximum. The motor 10e for the zone 5, which is adjacent downstream to the zone 4, is supplied with a current of 1 A, at the maximum. The motors 10b and 10c for the zones 2 and 3 are deenergized.

With articles in any other zones, the current suppressing circuit 30 operates to limit currents to be supplied to the motors in a similar manner as described above. The current suppression can make it possible to use a power supply of smaller capacity for the conveyor system than prior art.

In many cases, it is only for a short time period after the energization of a motor which has not been operated that the sum of currents flowing through the motors exceeds 5 A. A short time after the motor is energized, the sum current tends to decrease below 5 A. Then, the controllers start operating, and another motor, which has not been operated, may be energized, which may increase the sum current to a value equal to 5 A or larger. Then, the operation in the first current suppression mode of the current suppressing circuit 30 may take place. In other words, the conveyor system would operate in a "chattering" fashion.

To prevent such chattering operation, the current suppressing circuit 30 is adapted to operate in the second current suppression mode when the sum current becomes equal to or larger than the second reference current value but smaller than the first reference current value.

In the second current suppression mode, the currents to be supplied to the motors are modified in such a manner that the maximum current available for the motor for the most downstream loaded zone is the same as the current in the first current suppression mode, the maximum current available for the motor for the zone, if there, adjacent downstream to the most downstream loaded zone is the same as the current in the first current suppression mode, but the maximum available currents for the motors, which would be operated if no current suppression was provided, are increased by a predetermined amount, for example, 1 A, from the current value.

Let the previously discussed examples be assumed again. When articles are present in the zone 1, 2 and 4, the controllers 24a through 24f tend to operate the motors 10b, 10c, 10d and 10e for the zones 2, 3, 4 and 5, as described above. When the sum current becomes equal to or greater than the first reference current value, 5 A in this example, the current suppressing circuit 30 operates in the first current suppression mode to limit the currents to be supplied to the motors in such a manner that the maximum current available for the motor 10d for the zone 4 is 3A, the maximum current available for the motor 10e for the zone 5 is 2 A, and the maximum current available for the motor 10b for the zone 2 is 1 A. The motor 10c for the zone 3 is deenergized.

In this state, when the motor sum current decreases to a value below the first reference current value, 5A, but equal to or larger than the second reference current value, for example, 4 A, the current suppressing circuit 30 begins to operate in the second current suppression mode, to limit the maximum currents available for the motor 10d for the zone 4 and for the motor 10e for the zone 5 to 3A and 2 A, respectively, which are equal to the current values in the first current suppression mode. In the second current suppression mode, however, the maximum current available for the motor 2b for the zone 2 is increased to 2 A, and 1 A, at the maximum, is made available for the motor 10c for the zone 3.

In case that articles are present in the zones 3 and 5, the controllers 24a–24f operate in such a manner that only the motors 10c, 10d, 10e and 10f for the zones 3, 4, 5 and 6, respectively, can operate. If the current suppressing circuit 30 begins to operate in the first current suppression mode, the maximum current available to the motor 10e for the zone 5 is limited to 3 A, the maximum current available for the motor 10f for the zone 6 to 2 A, and the maximum current available for the motor 10c for the zone 3 to 1 A. The motor 10d for the zone 4 is deenergized.

When the second current suppression mode is initiated, the maximum currents available for the motors 10e and 10f for the zones 5 and 6 are maintained to be 3 A and 2 A, respectively, but the maximum current available for the motor 10c for the zone 3 is increased to 2 A, and also current of 1 A, at the maximum, is made available for the motor 10d for the zone 4.

In another example where articles are present in the zone 1, 2, 4 and 6, the controllers 24a through 24f are adapted to energize the motors 10a, 10b, 10c, 10d, 10e and 10f for the zone 1, 2, 3, 4, 5 and 6. However, in the first current suppression mode of the current suppressing circuit 30, the current limitation is performed in such a manner that the maximum current available for the motor 10f for the zone 6 becomes 3 A, the maximum current available for the motor 10d for the zone 4 becomes 2 A, the maximum current available for the motor 10e for the zone 5 becomes 1 A, and the remaining motors are deenergized. If the second excessive-current representative signal is developed, causing the second current suppression mode to take place, the maximum current available for the motor 10f for the zone 6 is maintained to be 3 A, but the maximum current available for the motor 10d for the zone 4 is increased to 3 A, the maximum current available for the motor 10e for the zone 5 is increased to 2 A, and a current of 1 A is allocated as the maximum available current to the motors 10b and 10c for the zones 2 and 3.

The current suppressing circuit 30 may be provided by a CPU (microprocessor). Alternatively, it may be formed of a logic circuit receiving the motor-operation signals from the respective controllers, as input signals. In either case, the circuit configuration of such CPU or logic circuit is obvious to people skilled in the art when required combinations of the motor-operation signals from the controllers 24a–24f are provided. Therefore, the detailed circuit arrangement of the current suppressing circuit 30 is not described.

If the sum of currents actually flowing through the motors is less than 5 A but equal to or larger than 4 A, the allocation of currents to the motors described above is maintained in the second current suppression mode. However, if the sum of currents actually flowing through the motors increases to or above 5 A, the first current suppression mode is performed again by the current suppressing circuit 30. On the other hand, if the current sum decreases below 4 A, the motors 10a through 10f are controlled only by the controllers 24a through 24f.

Figure 6:
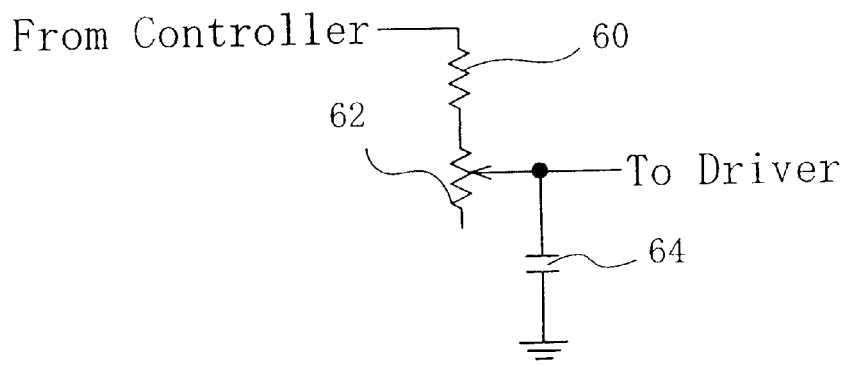
FIG. 6 is a circuit diagram of a delay circuit used in drivers of the conveyor system shown in FIG. 1.

As shown in FIG. 6, a delay circuit including a resistor 60, a variable resistor 62 and a capacitor 64 is provided in association with each driver. One end of the resistor 60 and one end of the variable resistor 62 are connected together. The other end of the resistor 60 is connected to the controller associated with the driver, and the other end of the variable resistor 62 is open. The movable arm of the variable resistor 62 is connected to the driver. The capacitor is connected between the movable arm of the variable resistor 62 and the ground. The delay circuit delays the motor-operation signal from the controller by a predetermined time before coupling it to the driver. With this arrangement, the transient current occurring when the motors are started can be suppressed, which prevents the sum current from exceeding the first reference current value. The delay circuits may be provided by the CPU, or they may be incorporated into the associated controllers 24a–24f or in the current suppressing circuit 30.

The above-described system is only an example, and various modifications may be obvious to people skilled in the art. For example, the motors 10a through 10f have been described to be disposed within the rollers to be driven by the motors, but they may be disposed external to the rollers. Instead of one drive roller, plural drive rollers may be used in a zone. Further, the first and second reference current values and the allowable sum current are not limited to 4 A, 5 A and 6 A, respectively, as described, but they may be different values. Also, the current suppressing circuit 30 has been described to operate in the first and second current suppression modes, but it may be arranged to operate in one of the first and second current suppression modes. In some applications, the current suppressing circuit 30 may be arranged to operate in more than two current suppression modes.

In the above description, the phrases "at the maximum" and "maximum current available for" have been used in describing currents to be supplied to the motors, because the motor needs to be supplied with the maximum current only when the article being conveyed in that zone is heavy and, if an article to be conveyed is light, the motor may not have to be driven with the maximum current.

What is claimed is:

1. A conveyor system comprising:
a plurality of motors each being associated with one of a plurality of zones each including plural rollers arranged in parallel with each other, each motor driving at least one of said rollers in the zone associated therewith, said zones being successively arranged in such a manner that an article can be conveyed from the upstream end to the downstream end of said conveyor system;
a plurality of article detecting means each disposed in association with one of said zones for detecting when an article is present in the associated zone and developing an article-representative signal;
current detecting means for detecting the sum of currents-flowing through said respective motors and developing an excessive-current representative signal when said sum exceeds a predetermined reference current value; and
control means connected to each of said article detecting means and said current detecting means for, when said excessive-current representative signal is present, operating to allocate only for a plurality of selected motors including the motors in the zones where first and second ones in sequence of articles being conveyed on said conveyor system are present, such currents that the maximum value of the sum of the currents flowing through said selected motors is a predetermined allowable current value.

2. The conveyor system according to claim 1 wherein said control means operates to allocate a largest proportion of said allowable current for the motor in the zone where said first article is present.

3. The conveyor system according to claim 2 wherein said control means operates to allocate an intermediate proportion of said allowable current smaller than said largest proportion for the motor in the adjacent downstream zone of said zone where said first article is present.

4. The conveyor system according to claim 3 wherein said control means operates to allocate a smallest proportion of said allowable current smaller than said intermediate proportion for the motor in the zone where said second article is present.

5. The conveyor system according to claim 2 wherein said control means, when said first article is present in a downstream end one of said zones, operates to allocate an intermediate proportion of said allowable current smaller than said largest proportion for the motor in the zone where said second article is present.

6. The conveyor system according to claim 5 wherein said control means operates to allocate a smallest proportion of said allowable current smaller than said intermediate proportion for the motor in the adjacent downstream zone of said zone where said second article is present.

7. A conveyor system comprising:

a plurality of motors each being associated with one of a plurality of zones including plural rollers arranged in parallel with each other, each motor driving at least one of said rollers in the zone associated therewith, said zones being successively arranged in such a manner that an article can be conveyed from the upstream end to the downstream end of said conveyor system;

a plurality of article detecting means each disposed in association with one of said zones for detecting when an article is present in the associated zone and developing an article-representative signal;

current detecting means for detecting the sum of currents flowing through said motors, said current detecting means developing a first excessive-current representative signal when the sum current exceeds a predetermined first reference current value and developing a second excessive-current representative signal when the sum current is smaller than said first reference current value but equal to or larger than a predetermined second reference current value which is smaller than said first reference current value; and control means connected to each of said article detecting means and to said current detecting means for, when said first excessive-current representative signal is present, operating to allocate, only for a first plurality of selected motors including the motors in the zones where first and second ones in sequence of articles being conveyed on said conveyor system are present, respective such currents that the sum current is equal to or smaller a predetermined allowable current value, and, when said second excessive-current representative signal is present, causing a second plurality, larger than said first plurality, of selected motors including the motors in the zones where said first and second articles being conveyed on said conveyor system are present, to be driven.

* * * * *